United States Patent
Woldanski

(10) Patent No.: US 6,231,794 B1
(45) Date of Patent: May 15, 2001

(54) PROCESS FOR MAKING A LOW DENSITY FOAM FILLED RETICULATED ABSORBER BY MEANS OF VACUUM

(75) Inventor: Greg L. Woldanski, Castaic, CA (US)

(73) Assignee: Lockheed Martin Corporation, Palmdale, CA (US)

( * ) Notice: Subject to any disclaimer, the term of this patent is extended or adjusted under 35 U.S.C. 154(b) by 0 days.

(21) Appl. No.: 09/472,312

(22) Filed: Dec. 27, 1999

(51) Int. Cl.[7] .................................................. B29C 44/04
(52) U.S. Cl. ...................... 264/45.3; 264/46.4; 264/46.6; 264/101; 264/102; 264/321
(58) Field of Search .................................. 264/101, 102, 264/45.3, 46.6, 46.4, 321

(56) References Cited

U.S. PATENT DOCUMENTS

| | | | | |
|---|---|---|---|---|
| 3,759,644 | * | 9/1973 | Ladney, Jr. | 264/102 |
| 3,878,279 | * | 4/1975 | Sorrells et al. | 264/101 |
| 3,970,732 | * | 7/1976 | Slaats et al. | 264/101 |
| 4,285,893 | * | 8/1981 | Contastin | 264/101 |
| 4,439,381 | * | 3/1984 | Gagliani et al. | 264/45.3 |
| 4,619,948 | * | 10/1986 | Kennedy et al. | 264/45.3 |
| 4,639,343 | * | 1/1987 | Long et al. | 264/321 |
| 4,938,901 | * | 7/1990 | Groitzsch et al. | 264/101 |
| 4,952,358 | * | 8/1990 | Okina et al. | 264/102 |
| 4,980,004 | * | 12/1990 | Hill | 264/45.3 |
| 5,066,437 | * | 11/1991 | Barito et al. | 264/102 |
| 5,135,959 | * | 8/1992 | Hill | 521/54 |
| 5,192,810 | * | 3/1993 | Hill | 521/52 |
| 5,225,454 | * | 7/1993 | Lofgren | 521/145 |
| 5,464,582 | * | 11/1995 | Okano et al. | 264/102 |
| 5,520,861 | * | 5/1996 | Powell et al. | 264/45.3 |
| 5,565,154 | * | 10/1996 | McGregor et al. | 264/101 |
| 5,711,905 | * | 1/1998 | Behl | 264/102 |
| 5,837,739 | * | 11/1998 | Nowak et al. | 521/54 |
| 5,845,877 | * | 12/1998 | Justice et al. | 244/131 |
| 5,851,458 | * | 12/1998 | De Vos et al. | 264/102 |
| 5,895,615 | * | 4/1999 | Hirata et al. | 264/102 |
| 5,972,260 | * | 10/1999 | Manni | 264/102 |

* cited by examiner

*Primary Examiner*—Allan R. Kuhns
(74) *Attorney, Agent, or Firm*—Robert A. Schruhl

(57) ABSTRACT

A method for making an improved absorber entails the loading of reticulated foam loaded with radar absorbing material and the forming and curing of the loaded foam in a mold on which vacuum is impressed prior to curing of the foam so that the foam expands and thereby experiences a substantial reduction in density of the resulting absorber structure.

4 Claims, 1 Drawing Sheet

PROCESS FOR MAKING A LOW DENSITY FOAM FILLED RETICULATED ABSORBER BY MEANS OF VACUUM

BACKGROUND OF THE INVENTION

1. Field of the Invention

The present invention relates to methods of making radar absorber structures, and more particularly to a method for forming absorber structures having reduced weight without compromised structural properties.

2. Description of the Related Art

The use of open-cell foam substrates having a conductive filler to form light-weight broadband microwave absorbers is known. However, such absorbers suffer from a variety of drawbacks.

For one thing, repeated flexure of the absorbers results in reduction of the elasticity, with resultant failure, of the foam, as well as failure or other deleterious effects in the conductive filler. In many situations, the foam absorbers are rendered defective due to improper distribution of the conductive material in the foam. In other situations, the weight of the absorber and conductive filler exceeds the permissible limits of the anticipated application.

U.S. Pat. No. 5,192,810 issued Mar. 9, 1993 to Hill discloses a method and apparatus for manufacturing dimpled structures from elastic cloth. The method permits forming complex polyimide foam shapes through the steps of impregnating a low density, open cell, reticulated foam with polyimide foam precursor, placing the combination in a mold, closing the mold, then heating the assembly to the foaming and curing temperatures of the precursor. As the powdered precursor expands, it spreads throughout the reticulated foam producing a product having substantially uniform density and polyimide foam characteristics. If desired, the reticulated foam can be removed from the product by using a material that outgasses and boils away at polyimide processing temperatures. Radar absorbing materials may be incorporated in the reticulated foam so that the final product will have uniformly distributed radar absorbing components with the desirable high temperature resistance and other properties of polyimide foams.

U.S. Pat. No. 5,845,877 to Justice et al. and issued on Dec. 8, 1998 discloses a sealing assembly for reducing the gap between an aircraft's movable flight control member and adjacent structures. The flight control member and adjacent structures have external surfaces and side surfaces facing each other. First and second flexible bulb seals are mounted on the periphery of the side surface of both the flight control member and the adjacent structure forming an extension of the external surface of both. Each bulb seal includes a compressible foam bulk absorber core. A first sheet of dielectric material is bonded to the bottom surface of the core. A second sheet of flexible resistive material is bonded to the top, and sides of the core. A third sheet of flexible magnetic radar absorbing material is bonded to the second sheet. A fourth sheet of flexible abrasion resistant material is bonded over the third sheet.

Against this background of known technology, the applicant has developed a novel method for forming a low density closed cell foam filled reticulated absorber having significant weight reduction properties and which can be shaped and cured to form simple or complex components at low cost and with little difficulty, while overcoming many of the deficiencies and drawbacks of similar absorbers currently known in the relevant technology

OBJECTS AND SUMMARY OF THE INVENTION

It is therefore an object of the present invention to provide an improved method for forming a foam filled reticulated structure containing radar absorbing materials for the attenuation of electromagnetic energy.

Another object is to provide a method for making a radar absorbing structure in which method the foam is loaded into a mold, covered and sealed in the mold, and then, prior to curing, subjected to a vacuum whereby the density of the foam is reduced thereby resulting in a significant reduction in weight of the structure.

Still another object of the invention is to provide a reticulated foam filled absorber which is capable of attenuating electromagnetic energy or radar over a broad range of frequencies.

The above objects are achieved according to the invention by the provision of an improved method for producing a foam filled reticulated absorber structure having electromagnetic energy attenuation characteristics, in which method the foam is deposited in a mold for forming and curing, but before curing is subjected to a vacuum in the mold to assist in the expansion of the foam thereby lowering the density of the foam prior to its being cured. To achieve the radar absorption effect, a conductive material is applied to the outer surface of the foam substrate or caused to be contained within the openings of the reticulated foam structure. The conductive material is preferably comprised of a particulate material, such as carbon powder, or a combination of carbon and a metal such as silver, copper or nickel. Whereas most foam absorbers exhibit densities on the order of 7.8 pounds per cubic foot, the foam product of the invention can be made lighter—on the order of 6.0 to 6.5 pounds per cubic foot —and thinner than conventional foam absorbers. The absorber made according to the present invention is also more durable and reproducible than existing reticulated foam absorbers. The foam absorber product of the invention retains efficient performance characteristics upon mechanical cycling, and is durable and has increased chemical resistance.

Other objects, advantages and features of the invention will become more apparent, as will equivalent structures which are intended to be covered herein, with the teaching of the principles of the invention in connection with the disclosure of the preferred embodiments thereof in the specification, claims and drawings in which:

DETAILED DESCRIPTION OF THE INVENTION

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide an improved process for forming a low density, reticulated foam filled absorber that encompasses many long sought after features that render such absorbers lighter and less costly to manufacture.

Figure 1:
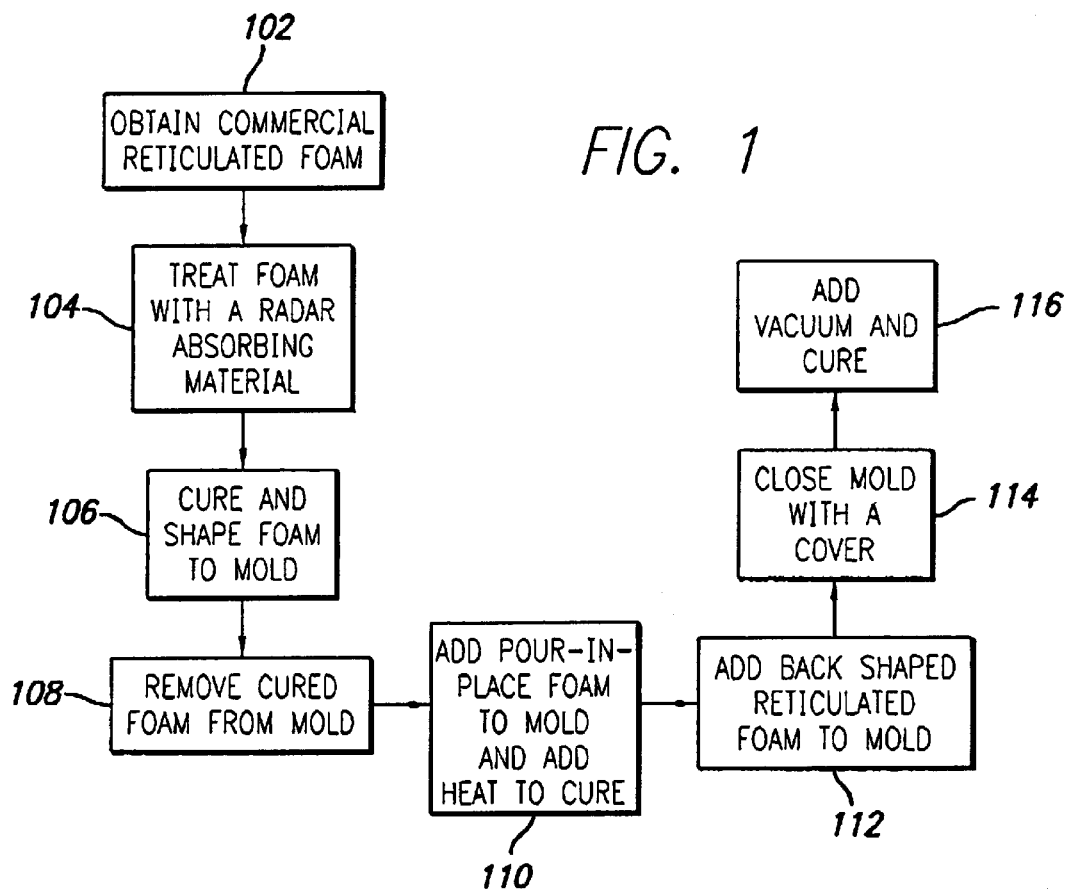
FIG. 1 is a schematic diagram showing preferred steps of the method of the present invention.
Figure 2:
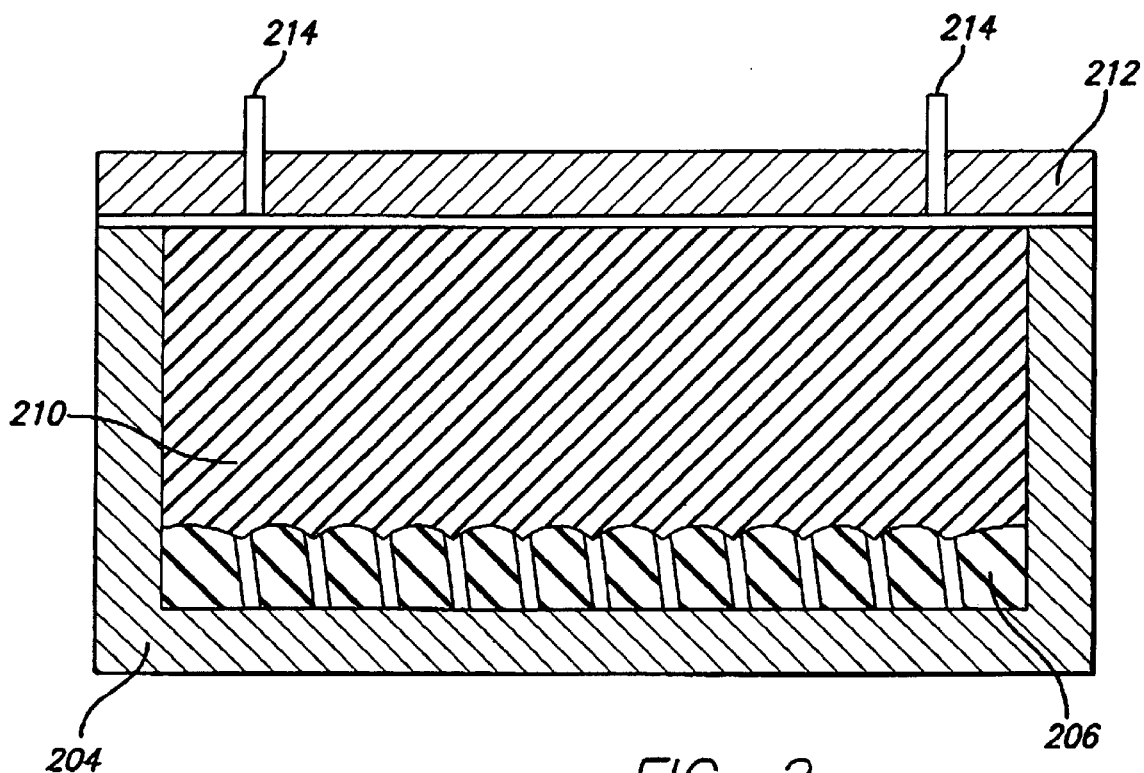
FIG. 2 is a side sectional view of the mold used in performing the process of the invention in accordance with steps shown in FIG. 1.

Referring now to FIGS. 1 and 2, the process of manufacture for the absorber of the present invention comprises a first step 102 of obtaining a quantity of commercially available reticulated foam (reticulated foam is a net-like foam having very low density and open cells, and typically a skeletal structure having at least about 90% open volume), a second step 104 of treating the foam with a radar absorbing material (as for example, by either coating the foam or by injecting the radar absorbing material into the foam), a third step 106 of fitting the reticulated foam to the shape of the final product to be made (or at least to the shape of a mold 204 [see FIG. 2] into which the foam is to be placed for curing), a fourth 108 of removing the cured shaped foam from said mold, a fifth step 110 of lining or priming the mold 204 with a first layer 206 of pour-in-place foam, a sixth step 112 of disposing the treated shaped reticulated foam 210 in the mold on top of the first layer of foam, a seventh step 114 of closing the mold with cover 212 and an eighth step 116 of imposing a vacuum on the interior of the mold through ports 214 (this contrasts with the teaching of the Hill patent discussed above in which, after the mold is closed, it is placed directly into the oven, with the cover not absolutely tightly closed to allow release of gases, while nevertheless being sufficiently tight to prevent extrusion of any expanding foam), and curing the thus-treated foam, referably directly in the mold by heating the mold to a curing temperature of about 250° to 300°, and then letting the closed mold stand for a minimum of 20 minutes.

Preferably, the reticulated foam, which may be water based or urethane based, can be commercially obtained in a number of different compositions. Any suitable reticulated foam having the desired properties may be used. Typical reticulated foams include SIF polyurethane foam (from Scotfoam, a subsidiary OF GFI of Eddystone, Pa, wihc is available in either ester or ether form and Basotect melamine foam from BASF Aktiengesellschaft, Ludwigshaffen, Germany.

Preferably, the radar absorbing material can comprise particulate carbon, such as a graphite powder, a conductive ink or spray on composition including a carbon or other metallic particulate, or a particulate carbon material mixed with a metal, such as silver.

Preferably, the vacuum applied to the foam through the ports in the mold is on the order of 8–10 inches Hg.

It is contemplated that the foam absorber of the present invention can be employed for any application to attenuate electromagnetic or radar energy, e.g. in aircraft components of aircraft where it is desired to avoid radar detection, or in applications for reducing background noise levels, e.g. from an antenna.

Those skilled in the art will appreciate that various adoptions and modifications of the invention as described above can be configured without departing from the scope and spirit of the invention. Therefore, it is to be understood that, within the scope of the appended claims, the invention may be practiced other than as specifically described herein.

What I claim is:

1. A method for making an absorber, comprising:

filling a mold with a first layer of foam material, covering said first layer of foam material with a second layer of foam material loaded with conductive particulate material, closing the mold with cover means, and impressing a vacuum on the foam in the interior of said mold, whereby said first and second layers of foam material in said mold expand to form a closed-cell absorber structure of decreased density having conductive particulate material uniformly dispersed therein.

2. The process of claim 1, and further including a step of curing said first and second layers of foam material in said mold after said foam material layers have expanded.

3. The process of claim 1, wherein the conductive particulate material comprises carbon particles.

4. The process of claim 1, wherein the conductive particulate material comprises a conductive ink including carbon particles suspended in a carrier fluid.

* * * * *